US 008817979B2

(12) United States Patent
Chu (10) Patent No.: US 8,817,979 B2
(45) Date of Patent: Aug. 26, 2014

(54) STANDALONE HARDWARE ACCELERATOR FOR ADVANCED ENCRYPTION STANDARD (AES) ENCRYPTION AND DECRYPTION

(75) Inventor: Hon Fai Chu, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 1703 days.

(21) Appl. No.: 10/932,832

(22) Filed: Sep. 2, 2004

(65) Prior Publication Data

US 2005/0271204 A1 Dec. 8, 2005

Related U.S. Application Data

(60) Provisional application No. 60/577,368, filed on Jun. 4, 2004.

(51) Int. Cl.
*H04L 9/00* (2006.01)
(52) U.S. Cl.
USPC ................ 380/44; 380/28; 380/259; 708/254
(58) Field of Classification Search
USPC .................. 380/28, 44, 259, 270; 708/254
See application file for complete search history.

(56) References Cited

U.S. PATENT DOCUMENTS

| | | | | |
|---|---|---|---|---|
| 6,243,470 B1 * | 6/2001 | Coppersmith et al. | ......... | 380/259 |
| 6,314,186 B1 * | 11/2001 | Lee et al. | ......... | 380/28 |
| 6,937,727 B2 * | 8/2005 | Yup et al. | ......... | 380/37 |
| 7,295,671 B2 * | 11/2007 | Snell | ......... | 380/28 |
| 7,826,613 B2 * | 11/2010 | Rose et al. | ......... | 380/37 |
| 2002/0012430 A1 * | 1/2002 | Lim | ......... | 380/29 |
| 2004/0184607 A1 * | 9/2004 | Chang et al. | ......... | 380/45 |
| 2005/0058285 A1 * | 3/2005 | Stein et al. | ......... | 380/29 |
| 2006/0177052 A1 * | 8/2006 | Hubert | ......... | 380/29 |

* cited by examiner

*Primary Examiner* — Amare F Tabor
(74) *Attorney, Agent, or Firm* — Foley & Lardner LLP (57) ABSTRACT

Systems and methods for accelerating AES encryption and decryption operations are provided. Aspects of the method may include time multiplexing a plurality of substitution boxes (S-boxes) for instantaneous key generation and byte substitution operations. Bytes may be substituted in at least a portion of a current security key information and at least a portion of a subsequent security key information within said plurality of S-boxes. The current security key may comprise 128 bits, 192 bits or 256 bits and the portion of the current security key may comprise 32 bits. The substituted portion of the security key information may be communicated to a key generator. The subsequent security key information may be generated utilizing the substituted portion of the current security key information. The current security key information may then be stored.

23 Claims, 6 Drawing Sheets

STANDALONE HARDWARE ACCELERATOR FOR ADVANCED ENCRYPTION STANDARD (AES) ENCRYPTION AND DECRYPTION

CROSS-REFERENCE TO RELATED APPLICATIONS/INCORPORATION BY REFERENCE

This application makes reference to, claims priority to, and claims the benefit of U.S. Provisional Application Ser. No. 60/577,368 filed Jun. 4, 2004 and entitled "Standalone Hardware Accelerator For Advanced Encryption Standard (AES) Encryption And Decryption."

This application makes reference to U.S. application Ser. No. 10/933,702 filed Sep. 2, 2004

The above stated applications are hereby incorporated herein by reference in their entirety.

FIELD OF THE INVENTION

Certain embodiments of the invention relate to protection of data. More specifically, certain embodiments of the invention relate to a method and system for accelerating Advanced Encryption Standard (AES) encryption and decryption operations.

BACKGROUND OF THE INVENTION

Current encryption standards include the DES and the 3DES encryption standards. Federal Information Processing Standards Publication (FIPS PUB) 197 was issued on Nov. 26, 2001 by the National Institute of Standards and Technology (NIST) introducing the Advanced Encryption Standard (AES). The AES specifies a FIPS-approved cryptographic algorithm that may be utilized to protect electronic data.

The AES algorithm may use cryptographic keys of 128, 192, and 256 bits to encrypt and decrypt data in blocks of 128. In addition, the AES algorithm may be implemented in software, firmware, hardware, or any combination thereof. However, the AES encryption/decryption standard requires significant processing capabilities for implementation, especially if the implementation is exclusively in software. As a result, significant processing loads may be placed on a digital signal processor (DSP), or another system processor, during operation of a device utilizing the AES encryption/decryption standard. As a result, a DSP or other system processor may become overloaded when processing AES encryption and decryption, thereby resulting in poor system performance.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for accelerating AES operations. Aspects of the method may comprise time multiplexing a plurality of substitution boxes (S-boxes) for instantaneous key generation and byte substitution. Bytes may be substituted in at least a portion of a current security key information and at least a portion of a subsequent security key information within the plurality of time-multiplexed S-boxes. The current security key may comprise 128 bits, 192 bits or 256 bits and the portion of the current security key may comprise 32 bits.

The substituted at least one portion of the security key information may be communicated to a key generator. The subsequent security key information may be generated utilizing the substituted portion of the current security key information. The current security key information may be stored. The subsequent security key information may be generated utilizing at least a portion of the current security key information. Bytes may be substituted in at least a portion of a data block within the plurality of time-multiplexed S-boxes, which may comprise 32 bits. Bytes may be shifted in at least one portion of a data block within the plurality of S-boxes.

Another aspect of the invention may provide a machine-readable storage, having stored thereon, a computer program having at least one code section executable by a machine, thereby causing the machine to perform the steps as described above for accelerating AES operations.

The system for accelerating AES operations may comprise a plurality of S-boxes that are time multiplexed for instantaneous key generation and byte substitution. The time-multiplexed S-boxes may substitute bytes in at least one portion of a current security key information and a subsequent security key information within the plurality of S-boxes. The current security key may comprise 128 bits, 192 bits or 256 bits, and the portion of the current security key may comprise 32 bits. The system may comprise a key generator that may receive the substituted portion of the security key information and may generate the subsequent security key information utilizing the substituted at least one portion of the current security key information.

The system may also include a storage block for storing the current security key information. The key generator may generate the subsequent security key information utilizing the portion of the current security key information. The S-boxes may substitute bytes in at least a portion of a data block, which may comprise 32 bits, within the plurality of S-boxes. The system may also comprise at least one multiplexer that is adapted to shift bytes in at least a portion of a data block within the plurality of S-boxes.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for accelerating Advanced Encryption Standard (AES) encryption and decryption operations. In one aspect of the invention, a hardware accelerator may be provided that performs AES encryption/decryption operations. A hardware accelerator that implements the AES encryption/decryption standard according to an embodiment of the invention may contribute to the reduction in the real estate of the silicon on a chip. For example, a reduced number of on-chip components or devices may be utilized and at least some of the on-chip devices may be multiplexed. A hardware accelerator may also reduce power consumption, improve throughput, and facilitate optimal frequency operation during signal processing.

An implementation of the AES encryption/decryption standard may utilize a 128, 192 or 256-bit key to encrypt or decrypt a 128-bit data block. The AES Rijndael algorithm utilizes four different byte-oriented transformations, which include byte substitution using a substitution table, or one or more S-boxes; shifting rows within a data block by different offsets; mixing the data within each column of a data block; and adding a round key to a data block. A plurality of round keys may be calculated utilizing an initial encryption/decryption key according to various key expansion routines, for example. A round key may be 128 bits.

Figure 1:
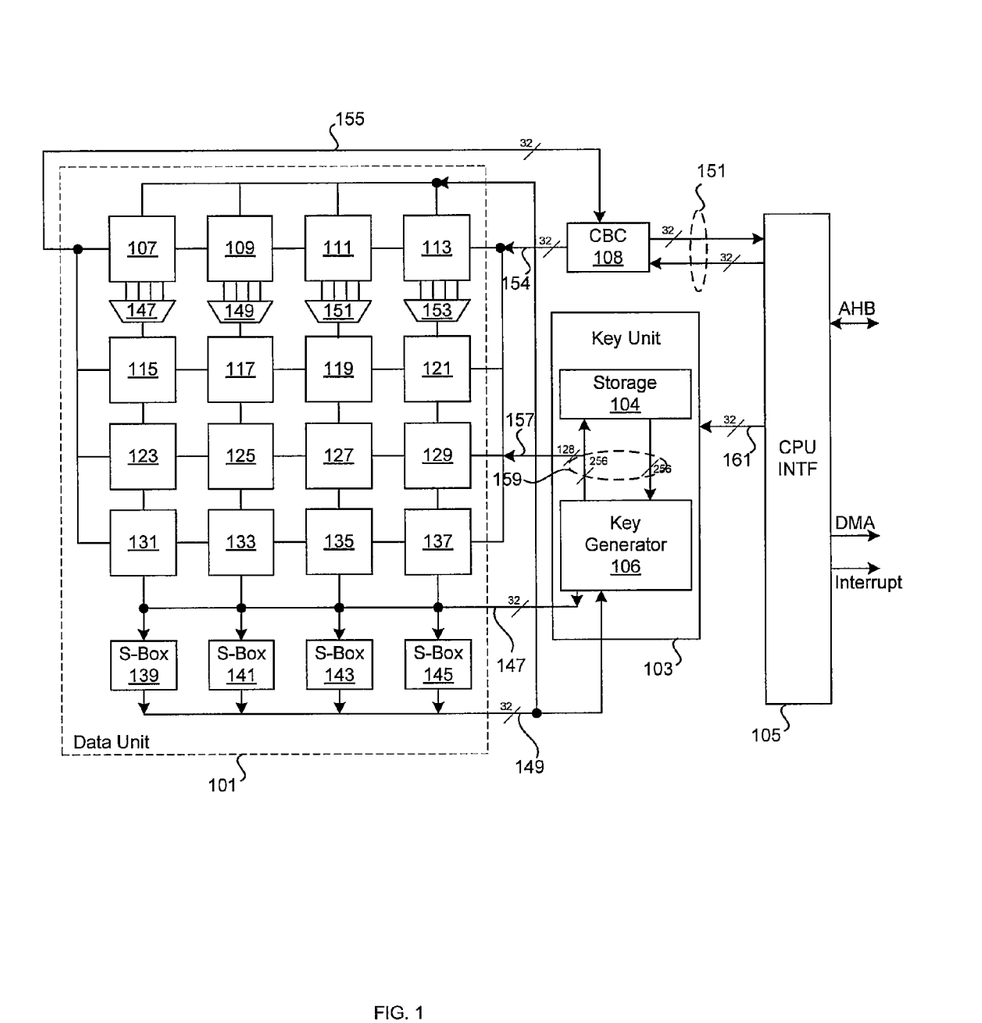
FIG. 1 is a block diagram of an exemplary hardware accelerator for Advanced Encryption Standard (AES) encryption and decryption, in accordance with an embodiment of the invention.

FIG. 1 is a block diagram of an exemplary hardware accelerator for Advanced Encryption Standard (AES) encryption and decryption, in accordance with an embodiment of the invention. Referring to FIG. 1, the exemplary hardware accelerator 100 may comprise a data unit 101, a key unit 103, a chain block ciphering (CBC) unit 108, and a CPU interface 105.

The data unit 101 may comprise a plurality of registers such as sixteen 8-bit registers, 107 through 137, multiplexers 147, 149, 151, and 153, and S-boxes 139, 141, 143, and 145. The sixteen 8-bit registers 107 through 137 may be adapted to store a total of eight bytes, or 128 bits for example. In this way, the data unit 101 may store a 128-bit input data block at one time, as required by the Rijndael algorithm of the AES encryption/decryption standard. The data unit 101 may be adapted to implement the four byte-oriented transformations of the AES encryption/decryption standard: byte substitution using a substitution table, or an S-box; shifting rows within a data block by different offsets; mixing the data within each column of a data block; and adding a round key to a data block.

The multiplexers 147, 149, 151, and 153 may be coupled to the first and second row of registers 107 through 113 and 115 through 121, respectively. The multiplexers 147, 149, 151, and 153 may comprise suitable circuitry, logic and/or code and may be adapted to perform the row shifting transformation of the AES encryption/decryption standard. More specifically, data within the sixteen 8-bit registers 107 through 137 may be cyclically shifted over different numbers of bytes, or offsets, utilizing the multiplexers 147, 149, 151, and 153. In one aspect of the invention, the last three rows of the 128-bit data block within the data unit 101 may be cyclically shifted so that different numbers of bytes may be shifted to lower positions within the data block rows. After a row is shifted down in the data unit 101, it may be substituted by the S-boxes 139, 141, 143, and 145.

The S-boxes 139, 141, 143, and 145 may comprise suitable circuitry, logic and/or code and may be adapted to perform byte substitution transformation of the AES encryption/decryption standard. The S-boxes 139, 141, 143, and 145 may utilize a Galois Field (GF) inversion followed by a Fourier transformation, or an affine transformation. The GF inversion and the affine transformation may be realized by using polynomial operations as outlined in the AES encryption/decryption standard. In one aspect of the invention, a data unit 101 may comprise a reduced number of S-boxes, so that several S-boxes may perform substitution transformations for all 128-bits within the data unit 101. For example, S-boxes 139, 141, 143, and 145 may be utilized for substitution transformation for one data row, or 32 bits, at a time. After the S-boxes 139, 141, 143, and 145 have performed substitution, the data unit 101 may utilize the multiplexers 147, 149, 151, and 153 to shift data down so that a new row may be transformed by the S-boxes 139, 141, 143, and 145. The reduced number of S-boxes may be utilized by the data unit 101 for time multiplexing different functions necessary for the implementation of the AES encryption/decryption standard.

The CBC unit 108 may comprise suitable circuitry, logic and/or code and may be adapted to exchange encrypted and decrypted information between the CPU interface 105 and the data unit 101. The CBC 108 may utilize 32-bit wide bus connections 151 to send and receive encrypted/decrypted data words to and from the CPU interface 105. In addition, the CBC 108 may communicate 32-bit word data words to the data unit 101 via the 32-bit wide bus 153 and may receive encrypted/decrypted information back from the data unit 101 via the 32-bit wide bus 155. The CBC 108 may also be adapted to utilize an original encryption key and a first encrypted message to obtain a second encryption key. In another embodiment of the invention, the CBC 108 may be utilized in an electronic code book (ECB) mode. The ECB mode may be utilized for a one-time encryption of a message by utilizing a single encryption key. When this occurs, any subsequent encryption of additional data may require a new encryption key.

The CPU interface 105 may be adapted to interface with a main processor (CPU). For example, the CPU interface 105 may generate DMA and/or interrupt commands to communicate with a CPU or other processor. In addition, a CPU via the CPU interface 105 may provide an initial encryption key to the key unit 103 via the 32-bit bus 161. The CPU interface 105 may provide unencrypted information to the CBC 108 and, in return, may receive encrypted information from the CBC 108 via the 32-bit bus connections 151.

The key unit 103 may comprise a storage module 104 and a key generator unit 106. The key generator unit 106 may comprise suitable circuitry, logic and/or code and may be adapted to generate 128-bit round keys from an initial encryption key. For example, the key generator unit may be adapted to generate a set of round keys that may be utilized during 10, 12 or 14 rounds of encryption of one 128-bit data block, depending on whether the hardware accelerator 100 utilizes a 128, 192 or a 256-bit encryption key, respectively. Encryption round keys generated by the key generator 106 may be stored in the storage unit 104 and may be utilized during subsequent encryption and/or decryption operations. The storage unit 104 and the key generator 106 are coupled via the 256-bit wide bus connections 159. In addition, a 128-bit wide bus connection 157 may be utilized for communicating a round key from the key unit 103 to the data unit 101.

In operation, an initial data word may be communicated from the CPU interface 105 to the CBC 108 via the bus connection 151 and then to the data unit 101 via the bus connection 154. An initial encryption key may be communicated from the CPU interface 105 to the key unit 103 via the bus connection 161. The key unit 103 may communicate the encryption key to the data unit 101 via the bus connection 157. After the data unit 101 receives an encryption or a decryption key from the key unit 103, the four byte-oriented transformations—byte substitution, shifting rows within a data block, mixing data within each column of a data block, and adding a round key to a data block—may be performed within the data unit 101. For each encryption/decryption round, the key generator 106 may be adapted to generate each round key "on the fly." In this way, the key generator 106 may generate a round key and store it in the storage unit 104.

After the round key is utilized by the data unit 101, the key generator 106 may recall the stored round key from the storage unit 104 and may utilize it to generate a new round key for the subsequent encryption/decryption round. A new round key may be generated by the key generator 106 by utilizing a key expansion routine, for example. During a key expansion routine, the key generator 106 may communicate, via the bus connection 147, a generated encryption/decryption round key to the S-boxes 139, 141, 143 and 145 for byte substitution. The S-boxes 139, 141, 143 and 145 may return a processed round key, or a subword, back to the key generator 106 via the 32-bit bus 149. By utilizing "on the fly" round key generation in the key unit 103 and by time multiplexing the S-boxes 139, 141, 143 and 145 between the key generator 106 and the 8-bit registers within the data unit 101, on-chip resources may be better utilized and signal processing performance within the hardware accelerator 100 may be increased.

Figure 2:
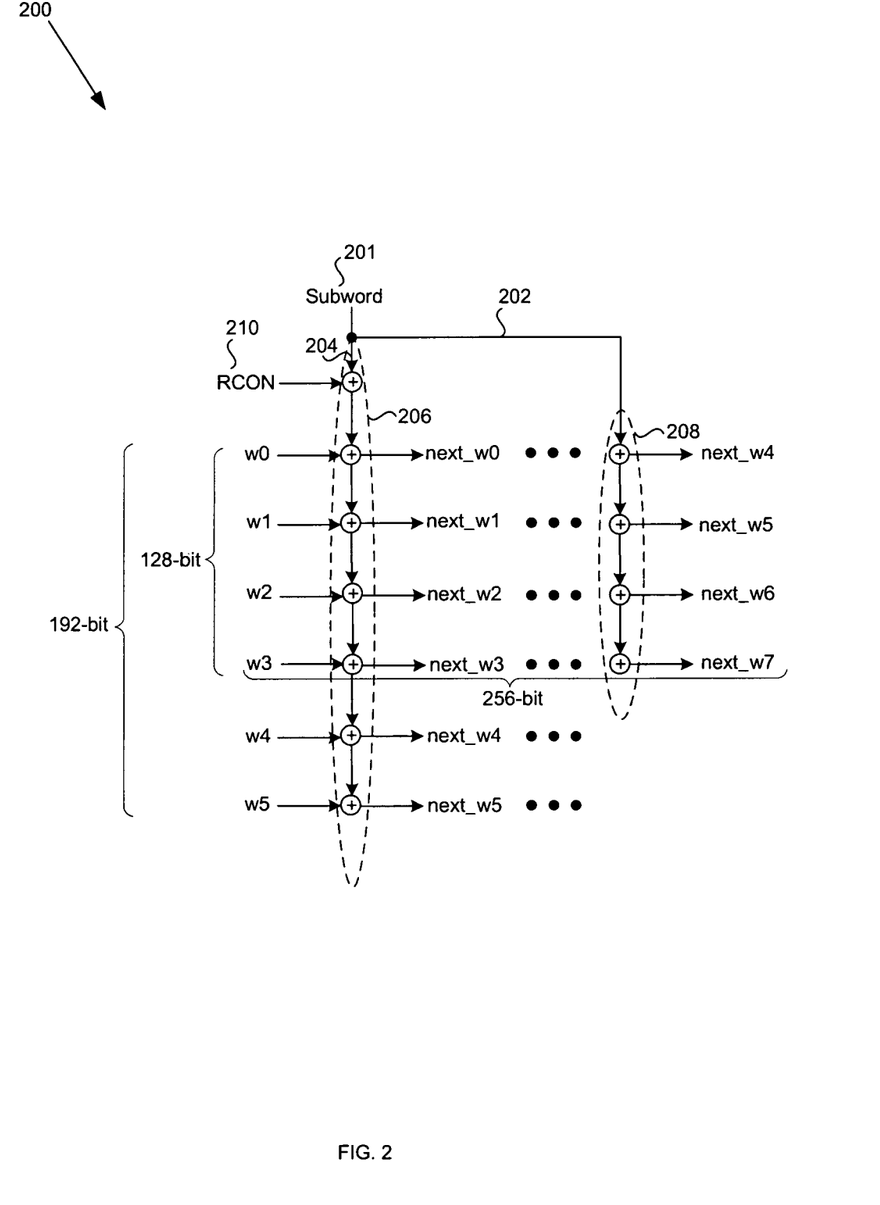
FIG. 2 is a functional diagram of an exemplary key generation routine that may be utilized by the hardware accelerator for AES encryption and decryption of FIG. 1, for example, in accordance with an embodiment of the invention.

FIG. 2 is a functional diagram of an exemplary key generation routine that may be utilized by the hardware accelerator for AES encryption and decryption of FIG. 1, for example, in accordance with an embodiment of the invention. Referring to FIG. 2, the key generation routine reflected on the diagram 200 may be performed in accordance with the key expansion routine of the AES encryption/decryption algorithm. A hardware accelerator for AES encryption and decryption in accordance with the invention may comprise a 32-bit CPU interface. The 32-bit interface may communicate a 4-root 32-bit word for a 128-bit encryption/decryption key, a 6-root 32-bit word for a 192-bit encryption/decryption key, and a 8-root 32-bit word for a 256-bit encryption/decryption key.

Each encryption/decryption key, therefore, may be divided into 32-bit size words. For example, a 128-bit key may be divided into four 32-bit words, w0 through w3. Similarly, a 192-bit key may be divided into six 32-bit words, w0 through w5, and a 256-bit key may be divided into eight 32-bit words, w0 through w7. A hardware accelerator for AES encryption and decryption in accordance with the invention may utilize 128-bit round keys that may be calculated from an initial 128-, 192-, or 256-encryption/decryption key. Therefore, a key expansion routine in accordance with the invention may utilize four 32-bit words to obtain one 128-bit round key for each processing round. Key expansion may be performed in accordance with the following routine:

If an initial 128-bit encryption/decryption key is utilized, then 128-bit round keys may be selected in a first round of key expansion from the 32-bit words w0 through w4. Subsequent round key selections may be performed in a similar manner. Round key selection may be represented by the following matrix (1):

$$\begin{matrix} w0 & w0' & w0'' & w0''' \\ w1 & w1' & w1'' & w1''' \\ w2 & w2' & w2'' & w2''' \\ w3 & w3' & w3'' & w3''' \end{matrix} \quad (1)$$

Each key expansion round may be represented by the columns in the above matrix (1). The first round key, represented by words w0 through w3, may then be utilized to generate a second round key. The second round key may be represented by words w0' through w3' in the second column of matrix (1). If an initial 128-bit encryption/decryption key is utilized, words w0' through w3' may be generated utilizing words w0 through w3, respectively. Similarly, words w0'' through w3'' may be generated utilizing words w0' through w3', respectively. All subsequent round keys may be generated in this manner.

If an initial 192-bit encryption/decryption key is utilized, then 128-bit round keys may be selected in a first round of key expansion from the 32-bit words w0 through w3. Since the initial key is a 192-bit key, six 32-bit words may be generated, w0 through w5. As a result, a second round key may be selected during a second round of key expansion from words w4, w5, w0' and w1'. Subsequent round key selections may be performed in a similar manner. Round key selection may be represented by the following matrix (2):

$$\begin{matrix} w0 & w4 & w2' & w0'' & w4'' & w2''' \\ w1 & w5 & w3' & w1'' & w5'' & w3''' \\ w2 & w0' & w4' & w2'' & w0''' & w4''' \\ w3 & w1' & w5' & w3'' & w1''' & w5''' \end{matrix} \quad (2)$$

Each key expansion round may be represented by the columns in the above matrix (2). The first round key, represented by words w0 through w3, may then be utilized to generate a second round key. The second round key may be represented by words w4 through w1' in the second column of matrix (2). If an initial 192-bit encryption/decryption key is utilized, words w0' through w5' may be generated utilizing words w0 through w5, respectively. Similarly, words w0'' through w5'' may be generated utilizing words w0' through w5', respectively. All subsequent round keys may be generated in this manner.

If an initial 256-bit encryption/decryption key is utilized in an AES encryption/decryption hardware accelerator in accordance with an embodiment of the invention, 128-bit round keys may be selected in a first round of key expansion from the 32-bit words w0 through w3. Since the initial key is a 256-bit key, eight 32-bit words may be generated, w0 through w7. As a result, a second round key may be selected during a second round of key expansion from words w4, w5, w6 and w7. Subsequent round key selections may be performed in a similar manner. Round key selection may be represented by the following matrix (3):

$$\begin{matrix} w0 & w4 & w0' & w4' & w0''' & w4''' \\ w1 & w5 & w1' & w5' & w1''' & w5''' \\ w2 & w6 & w2' & w6' & w2''' & w6''' \\ w3 & w7 & w3' & w7' & w3''' & w7''' \end{matrix} \quad (3)$$

Each key expansion round may be represented by the columns in the above matrix (3). The first round key, represented by words w0 through w3, may then be utilized to generate a second round key. The second round key may be represented by words w4 through w7 in the second column of matrix (3). If an initial 256-bit encryption/decryption key is utilized, words w0' through w7' may be generated utilizing words w0 through w7, respectively. Similarly, words w0'' through w7'' may be generated utilizing words w0' through w7', respectively. All subsequent round keys may be generated in this manner.

Referring again to FIG. 2, there is illustrated an exemplary round key generation routine, which may be utilized for a 128, 196, or 256-bit input encryption/decryption key. Referring now to FIGS. 1 and 2, in one aspect of the invention, an initial encryption/decryption key may be communicated from the key unit 103 to the data unit 101 within the hardware accelerator for AES encryption/decryption 100. The initial encryption/decryption key may undergo byte substitution in the S-boxes 139 through 145, for example. A subword 201 may then be returned for a key expansion routine. For a 128-bit or a 192-bit initial encryption/decryption key, sub-routine 204 may be utilized for calculation of round keys. If the initial key is a 128-bit key, then words w0 through w3 may be utilized according to the exemplary routine illustrated on FIG. 2 to obtain subsequent round keys next_w0 through next_w3, respectively.

If the initial key is a 192-bit key, then words w0 through w5 may be utilized according to the exemplary routine illustrated on FIG. 2 to obtain subsequent round keys next_w0 through next_w5, respectively. During the sub-routine 204, a constant RCON 210 may be utilized together with XOR operators 206 to obtain the 32-bit key words w0 through w5. The RCON 210 constant may be calculated in accordance with the AES encryption/decryption standard and may be different for each key expansion round, for example.

For a 256-bit initial encryption/decryption key, sub-routine 202 may be utilized for calculation of the round keys. In one aspect of the invention, only a portion of the XOR operators 206 may be utilized, together with XOR operators 208, to calculate round keys from 32-bit words w0 through w3. In this way, by reducing the amount of XOR operators, the hardware accelerator efficiency may be increased.

The calculation of the words w0 through w5 and w0' through w5' for 128, 192 and 256-bit initial encryption/decryption keys during a key expansion routine may be represented by the following equations:

For 128-bit initial encryption/decryption key, the following equations (4) apply:

| | Encryption | Decryption |
|---|---|---|
| (4) | w0' = sbox(rot(w3)) ⊕ RCON ⊕ w0 | w0 = sbox(rot(w3)) ⊕ RCON ⊕ w0' |
| | w1' = w0' ⊕ w1 | w1 = w0' ⊕ w1' |
| | w2' = w1' ⊕ w2 | w2 = w1' ⊕ w2' |
| | w3' = w2' ⊕ w3 | w3 = w2' ⊕ w3' |

For 192-bit initial encryption/decryption key:
Same equations as for the 128-bit key plus the following equations (5) apply:

| | | |
|---|---|---|
| (5) | w4' = w3' ⊕ w4 | w4 = w3' ⊕ w4' |
| | w5' = w4' ⊕ w5 | w5 = w4' ⊕ w5' |
| | w0' = sbox(rot(w5)) ⊕ RCON ⊕ w0 | w0 = sbox(rot(w5)) ⊕ RCON ⊕ w0' |

For 256-bit initial encryption/decryption key:
Same equations as for the 128-bit key plus the following equations (6) apply:

| | | |
|---|---|---|
| (6) | w4' = sbox(w3) ⊕ w4 | w4 = sbox(w3) ⊕ w4' |
| | w5' = w4' ⊕ w5 | w5 = w4' ⊕ w5' |
| | w6' = w5' ⊕ w6 | w6 = w5' ⊕ w6' |
| | w7' = w6' ⊕ w7 | w7 = w6' ⊕ w7' |
| | w0' = sbox(rot(w7)) ⊕ RCON ⊕ w0 | w0 = sbox(rot(w7)) ⊕ RCON ⊕ w0' |

The RCON[i] constant may be calculated according to the following equations:
A multiplication equation may be utilized for encryption:

$$x\text{time} = [\text{input}[7] \ \& \ 1B] \oplus \{\text{input}[6{=}0], 1b0\}$$

A division equation may be utilized for decryption:

$$x \ \text{div} = [\text{input}[0] \ \& \ 8D] \oplus \{1b0, \text{input} \ [7{=}1]\}$$

Figure 3:
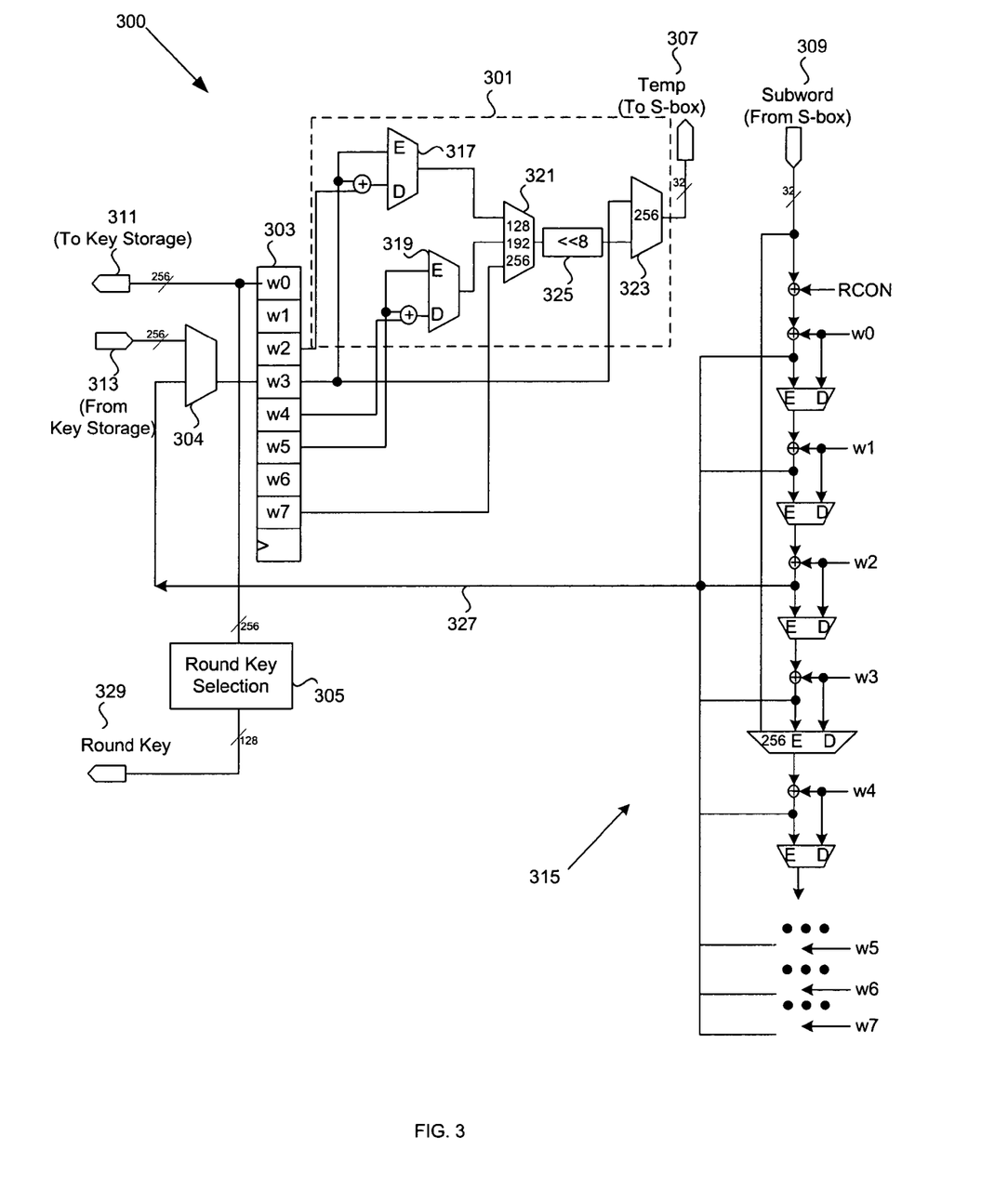
FIG. 3 is a block diagram of an exemplary key generator that may be utilized by the hardware accelerator for AES encryption and decryption of FIG. 1, for example, in accordance with an embodiment of the invention.

FIG. 3 is a block diagram of an exemplary key generator that may be utilized by the hardware accelerator for AES encryption and decryption of FIG. 1, for example, in accordance with an embodiment of the invention. Referring to FIG. 3, the key generator 300 may comprise rotation logic 301, register 303, multiplexer 304, round key selection unit 305, and round key calculation logic 315.

The rotation logic 301 may comprise multiplexers 317, 319, 321, and 323, and a rotator unit 325. The multiplexers 317 and 319 may be coupled to XOR operators so that 32-bit words received from the register 303 may be XORed according to the AES encryption/decryption standard. In addition, the multiplexers 317 and 319 may be adapted to handle encryption and decryption operations as required by the rotation logic 301. The multiplexers 321 and 323 may be adapted to handle rotation of 32-bit words received from the register 303 according to the size of the initial encryption key. In this way, the multiplexer 321, for example, may receive words w0 through w3 for a 128-bit initial key, words w0 through w5 for a 192-bit initial key, and words w0 through w7 for a 256-bit key.

In operation, the rotation logic 301 may receive 32-bit words from the register 303 depending on the size of the initial encryption/decryption key. Not all 32-bit words may require rotation, as reflected in equations (4), (5) and (6) above. After a word is rotated, it may be communicated outside the key generator 300 via a temp output 307. The temp output 307 may be coupled to one or more S-boxes so that a rotated word may be substituted. After a rotated word is substituted, it may be communicated back to the key generator 300 via the subword input 309. The key calculation logic 315 may then calculate round keys, as described above with regard to FIG. 2. After the key calculation logic calculates a round key, the calculated round key may be communicated to the multiplexer 304 via the connection 327.

The multiplexer 304 may be adapted to obtain a round key from a key storage unit, for example the key storage unit 104 of FIG. 1, via the input connection 313. The multiplexer may also obtain a round key calculated by the key calculation logic 315. A key obtained from a key storage unit or from the key calculation logic 315 may be communicated from the multiplexer 304 to the register 303 for further calculation of subsequent round keys. A calculated round key may be stored in a key storage unit via the output 311, or it may be stored in a round key selection module 305. After a key is stored in the round key selection module, it may be communicated outside the key generator 300 for further processing via the round key output 329.

Figure 4:
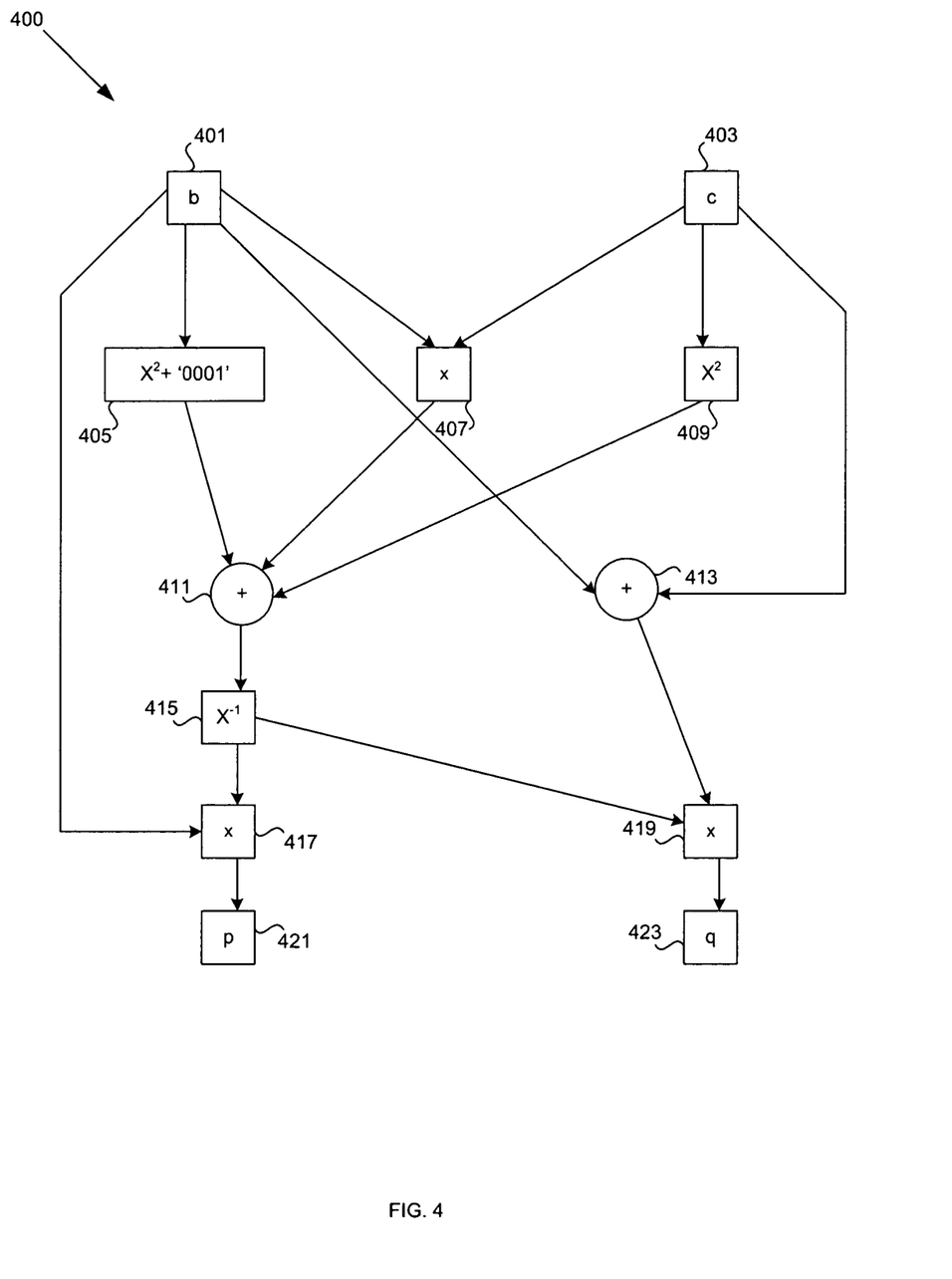
FIG. 4 is a functional diagram of an exemplary Galois Field (GF) 16-bit first order polynomial inversion that may be utilized by the hardware accelerator for AES encryption and decryption of FIG. 1, for example, in accordance with an embodiment of the invention.

FIG. 4 is a functional diagram of an exemplary Galois Field (GF) 16-bit first order polynomial inversion that may be utilized by the hardware accelerator for AES encryption and decryption of FIG. 1, for example, in accordance with an embodiment of the invention. Referring to FIG. 4, the polynomial inversion reflected on diagram 400 may be achieved in an S-box in accordance with the specification of the AES encryption/decryption standard.

During an encryption process, an S-box may be utilized for inversion of a 256-bit Galois Field, GF(256). Affine transformation may then be performed after a GF(256) inversion. During a decryption process, an inverse affine transformation may be initially performed followed by a GF(256) inversion.

In one aspect of the invention, an S-box may be adapted to perform the GF(256) inversion by utilizing a 16-bit Galois Field, GF(16), inversion. A GF(256) inversion may be performed in the following order:

GF(256)→first order polynomial in GF(16) with optimal normal basis→GF(16) inversion of the first order polynomial→GF(256)

A GF(256) may first be transformed to a GF(16) with optimal normal basis. GF(16) inversion may then be accomplished, followed by a transformation back into a GF(256). The GF(256) inversion process may utilize the following equation (7):

$$(bx+c)^{-1} = b(b^2B+bcA+c^2)^{-1}x + (c+bA)(b^2B+bcA+c^2)^{-1} \quad (7)$$

In the above equation (7), A may be selected to be multiplicative identity and B may be selected as a 4-bit vector '0001' representing minimum Hamming weight. In this way, A and B may be optimized for GF(16) as Massey-Omura multipliers.

Referring again to FIG. 4, the GF(16) optimal normal basis transformation may be achieved by utilizing a polynomial (bx+c). The subsequent GF(16) inversion may be represented by a new polynomial (px+q). The diagram 400 illustrates an exemplary transformation of coefficients b401 and c403, representing the (bx+c) polynomial, into the coefficients p421 and q423. During this transformation, multiplication operators 407, 417 and 419 may be utilized, together with addition operators 411 and 413. The vector addition operator 405 may be achieved by adding a 4-bit vector '0001' to $x^2$. Operator 409 may be represented by squaring the indeterminate x in a 16-bit Galois Field. The calculations reflected on FIG. 4 may be performed in the GF(16). The inverse value operator 415 may be obtained from a look-up table, for example. A look-up table may be generated so that it is compliant with the AES encryption/decryption specification.

According to the Rijndael algorithm in the AES encryption/decryption specification, GF(256) inversion may be performed by utilizing the polynomial $m(x)=x^8+x^4+x^3+x+1$. In accordance with an aspect of the invention, GF(256) inversion may be performed utilizing the following operations.

Initially, the basis in m(x) may be changed to $p(x)=x^8+x^4+x^3+x^2+1$, which is a primitive irreducible polynomial. The following operations may be performed:

Let $\beta = \alpha^k$, $m(\beta) = \alpha^{8k} + \alpha^{4k} + \alpha^{3k} + \alpha^k + 1 = 0$ For k=25, $$\{1, \beta, \beta^2, \beta^3, \beta^4, \beta^5, \beta^6, \beta^7\} \rightarrow \{1, \alpha^{25}, \alpha^{50}, \alpha^{75}, \alpha^{100}, \alpha^{125}, \alpha^{150}, \alpha^{175}\}$$

$$\alpha = T_\beta^\alpha \beta \begin{cases} \alpha - \{\alpha_0, \alpha_1, \alpha_2, \alpha_3, \alpha_4, \alpha_5, \alpha_6, \alpha_7\} \\ \beta - \{\beta_0, \beta_1, \beta_2, \beta_3, \beta_4, \beta_5, \beta_6, \beta_7\} \end{cases}$$

$$T = \begin{matrix} 1 & 1 & 1 & 1 & 1 & 1 & 1 & 1 \\ 0 & 1 & 0 & 1 & 0 & 1 & 0 & 1 \\ 0 & 0 & 1 & 1 & 0 & 0 & 1 & 1 \\ 0 & 0 & 0 & 1 & 0 & 0 & 0 & 1 \\ 0 & 0 & 0 & 0 & 1 & 1 & 1 & 1 \\ 0 & 0 & 0 & 0 & 0 & 1 & 0 & 1 \\ 0 & 0 & 0 & 0 & 0 & 0 & 1 & 1 \\ 0 & 0 & 0 & 0 & 0 & 0 & 0 & 1 \end{matrix} \quad T^{-1} = T \text{ also.}$$

Subsequently, GF(256) on p(x) may be transformed to (bx+c) on GF(16). The following operations may be performed:

Let $\lambda = \alpha^i x^2 + Ax + B = (x+\lambda)(x+\lambda^{16})$ $$\begin{aligned} A &= 1 \rightarrow \lambda + \lambda^{16} = 1 \\ B &= 0001 \rightarrow \gamma = \lambda \cdot \lambda^{16} \\ O.N.B. &\rightarrow \gamma^5 = 1 \\ &\Rightarrow i = 111 \\ \lambda &= \alpha^{111}, \gamma = \lambda^{17} = \alpha^{102} \end{aligned}$$

$\{\gamma, \gamma^2, \gamma^6, \gamma^8, \gamma\lambda, \gamma^2\lambda, \gamma^4\lambda, \gamma^8\lambda,\} \rightarrow$ $$\{\alpha^{102}, \alpha^{204}, \alpha^{153}, \alpha^{51}, \alpha^{213}, \alpha^{60}\alpha^8, \alpha^{162}\}$$

$\alpha = T_\gamma^\alpha \gamma$ $$T_\gamma^\alpha = \begin{matrix} 0 & 1 & 0 & 0 & 0 & 1 & 0 & 1 \\ 0 & 0 & 1 & 1 & 1 & 0 & 1 & 1 \\ 1 & 1 & 0 & 0 & 0 & 0 & 0 & 1 \\ 0 & 1 & 0 & 1 & 0 & 1 & 1 & 1 \\ 0 & 1 & 1 & 0 & 1 & 1 & 1 & 1 \\ 0 & 0 & 0 & 0 & 1 & 1 & 1 & 1 \\ 1 & 1 & 0 & 0 & 1 & 0 & 0 & 0 \end{matrix} \quad T_\alpha^\gamma = \begin{matrix} 1 & 0 & 0 & 0 & 1 & 1 & 1 & 1 \\ 1 & 1 & 1 & 1 & 1 & 1 & 1 & 0 \\ 1 & 1 & 1 & 1 & 0 & 0 & 1 & 0 \\ 1 & 0 & 0 & 1 & 1 & 0 & 0 & 1 \\ 0 & 1 & 1 & 1 & 0 & 0 & 1 & 1 \\ 0 & 0 & 1 & 0 & 1 & 1 & 1 & 1 \\ 0 & 0 & 0 & 0 & 1 & 0 & 0 & 1 \end{matrix}$$

GF(256)=m(x) may be transformed to GF(16) first order polynomial with optimal normal basis (ONB) by performing the following operations:

$\{1, \beta, \beta^2, \beta^3, \beta^4, \beta^5, \beta^6, \beta^7\} \leftrightarrow$ $$\{\gamma, \gamma^2, \gamma^4, \gamma^8, \gamma\lambda, \gamma^2\lambda, \gamma^4\lambda, \gamma^8\lambda,\}$$

$\gamma = T_\beta^\gamma \beta = (T_\gamma^\alpha)^{-1} T_\beta^\alpha \beta$; $\beta = T_\gamma^\beta \gamma = T_\beta^\alpha T_\gamma^\alpha \gamma$ -continued $$T_\beta^\gamma = \begin{bmatrix} 1 & 1 & 1 & 1 & 0 & 1 & 1 & 1 \\ 1 & 0 & 0 & 0 & 0 & 0 & 0 & 1 \\ 1 & 0 & 0 & 0 & 1 & 0 & 1 & 1 \\ 1 & 1 & 1 & 0 & 0 & 0 & 0 & 0 \\ 0 & 1 & 1 & 1 & 0 & 1 & 0 & 1 \\ 0 & 0 & 1 & 1 & 1 & 0 & 1 & 1 \\ 0 & 0 & 0 & 0 & 1 & 1 & 1 & 0 \\ 0 & 1 & 0 & 0 & 0 & 1 & 0 & 1 \end{bmatrix}; T_\gamma^\beta = \begin{bmatrix} 0 & 0 & 1 & 0 & 1 & 1 & 0 & 1 \\ 0 & 0 & 0 & 0 & 1 & 1 & 1 & 0 \\ 0 & 0 & 1 & 1 & 0 & 0 & 1 & 1 \\ 0 & 0 & 1 & 1 & 1 & 0 & 1 & 0 \\ 1 & 1 & 0 & 0 & 0 & 1 & 0 & 1 \\ 0 & 1 & 1 & 0 & 0 & 0 & 1 & 0 \\ 1 & 0 & 1 & 0 & 0 & 1 & 0 & 1 \\ 0 & 1 & 1 & 0 & 1 & 1 & 0 & 1 \end{bmatrix}$$

For encryption, a 256-bit Galois Field, GF(256), may be transformed to GF(16), followed by an affine transformation. For decryption, an inverse affine transformation may be initially performed followed by a GF(256) inversion. The following vectors may be utilized during encryption and decryption:

Affine/Inv-Affine $$b' = \begin{bmatrix} 1 & 0 & 0 & 0 & 1 & 1 & 1 & 1 \\ 1 & 1 & 0 & 0 & 0 & 1 & 1 & 1 \\ 1 & 1 & 1 & 0 & 0 & 0 & 1 & 1 \\ 1 & 1 & 1 & 1 & 0 & 0 & 0 & 1 \\ 1 & 1 & 1 & 1 & 1 & 0 & 0 & 0 \\ 0 & 1 & 1 & 1 & 1 & 1 & 0 & 0 \\ 0 & 0 & 1 & 1 & 1 & 1 & 1 & 0 \\ 0 & 0 & 0 & 1 & 1 & 1 & 1 & 1 \end{bmatrix} b \oplus \begin{bmatrix} 1 \\ 1 \\ 0 \\ 0 \\ 0 \\ 1 \\ 1 \\ 0 \end{bmatrix}; b = \begin{bmatrix} 0 & 0 & 1 & 0 & 0 & 1 & 0 & 1 \\ 1 & 0 & 0 & 1 & 0 & 0 & 1 & 0 \\ 0 & 1 & 0 & 0 & 1 & 0 & 0 & 1 \\ 1 & 0 & 1 & 0 & 0 & 1 & 0 & 0 \\ 0 & 1 & 0 & 1 & 0 & 0 & 1 & 0 \\ 0 & 0 & 1 & 0 & 1 & 0 & 0 & 1 \\ 1 & 0 & 0 & 1 & 0 & 1 & 0 & 0 \\ 0 & 1 & 0 & 0 & 1 & 0 & 1 & 0 \end{bmatrix} b' \oplus \begin{bmatrix} 1 \\ 0 \\ 1 \\ 0 \\ 0 \\ 0 \\ 0 \\ 0 \end{bmatrix}$$

Inv-affine/256 → 16

$$0 = \begin{bmatrix} 1 & 0 & 1 & 0 & 1 & 1 & 0 & 1 \\ 0 & 1 & 1 & 0 & 1 & 1 & 1 & 1 \\ 1 & 0 & 1 & 0 & 1 & 0 & 0 & 1 \\ 1 & 1 & 1 & 1 & 1 & 1 & 1 & 0 \\ 0 & 0 & 0 & 1 & 1 & 1 & 0 & 0 \\ 0 & 1 & 1 & 0 & 0 & 0 & 0 & 1 \\ 1 & 1 & 1 & 0 & 1 & 1 & 1 & 1 \\ 1 & 1 & 1 & 1 & 0 & 0 & 0 & 1 \end{bmatrix} i \oplus \begin{bmatrix} 0 \\ 1 \\ 1 \\ 0 \\ 0 \\ 1 \\ 0 \\ 0 \end{bmatrix}$$

16 → 256/Affine $$0 = \begin{bmatrix} 0 & 1 & 0 & 0 & 0 & 0 & 1 & 0 \\ 1 & 0 & 0 & 0 & 1 & 0 & 0 & 1 \\ 1 & 1 & 0 & 1 & 1 & 0 & 0 & 0 \\ 0 & 1 & 0 & 0 & 0 & 1 & 1 & 1 \\ 1 & 1 & 1 & 0 & 1 & 1 & 1 & 1 \\ 1 & 0 & 1 & 0 & 0 & 0 & 0 & 0 \\ 0 & 0 & 0 & 0 & 1 & 0 & 1 & 1 \\ 0 & 1 & 0 & 1 & 0 & 1 & 0 & 1 \end{bmatrix} i \oplus \begin{bmatrix} 1 \\ 1 \\ 0 \\ 0 \\ 0 \\ 1 \\ 1 \\ 0 \end{bmatrix}$$

The 8-bit vectors utilized in the above calculations may be obtained from the AES encryption/decryption standard. GF(16) transformation with ONB and GF(16) multiplication may be performed utilizing, for example, a Massey-Omura Parallel Multiplier, as follows:

$$d = (bx^t)(c\alpha^t)^t = bMc^t$$

$$M = \alpha^t \alpha = \begin{bmatrix} \alpha^2 & \alpha^3 & \alpha^5 & \alpha^9 \\ \alpha^3 & \alpha^4 & \alpha^6 & \alpha^{10} \\ \alpha^5 & \alpha^6 & \alpha^8 & \alpha^{12} \\ \alpha^9 & \alpha^{10} & \alpha^{12} & \alpha \end{bmatrix} = \begin{bmatrix} 0 & 0 & 1 & 0 \\ 0 & 0 & 1 & 1 \\ 1 & 1 & 0 & 0 \\ 0 & 1 & 0 & 1 \end{bmatrix} \begin{matrix} \Leftarrow \alpha^5 = 1 \\ \Leftarrow \alpha^6 = \alpha \\ \Leftarrow \alpha^{10} = \alpha^5 \end{matrix}$$

An exemplary multiplicative inversion table for GF(16) may be represented by the following matrices, where $f^{-1}$ represents the corresponding matrix. The multiplicative inversion table may be implemented as a look-up table.

| Y | $Y^2$ | $Y^4$ | $Y^8$ | | Y | $Y^2$ | $Y^4$ | $Y^8$ |
|---|---|---|---|---|---|---|---|---|
| 0 | 0 | 0 | 0 | | 0 | 0 | 0 | 0 |
| 0 | 0 | 0 | 1 | | 0 | 1 | 0 | 0 |
| 0 | 0 | 1 | 0 | | 1 | 0 | 0 | 0 |
| 0 | 0 | 1 | 1 | | 1 | 1 | 1 | 0 |
| 0 | 1 | 0 | 0 | | 0 | 0 | 0 | 1 |
| 0 | 1 | 0 | 1 | | 1 | 0 | 1 | 0 |
| 0 | 1 | 1 | 0 | $\xrightarrow{f^{-1}}$ | 1 | 1 | 0 | 1 |
| 0 | 1 | 1 | 1 | | 1 | 0 | 0 | 1 |
| 1 | 0 | 0 | 0 | | 0 | 0 | 1 | 0 |
| 1 | 0 | 0 | 1 | | 0 | 1 | 1 | 1 |
| 1 | 0 | 1 | 0 | | 0 | 1 | 0 | 1 |
| 1 | 0 | 1 | 1 | | 1 | 1 | 0 | 0 |
| 1 | 1 | 0 | 0 | | 1 | 0 | 1 | 1 |
| 1 | 1 | 0 | 1 | | 0 | 1 | 1 | 0 |
| 1 | 1 | 1 | 0 | | 0 | 0 | 1 | 1 |
| 1 | 1 | 1 | 1 | | 1 | 1 | 1 | 1 |

Figure 5:
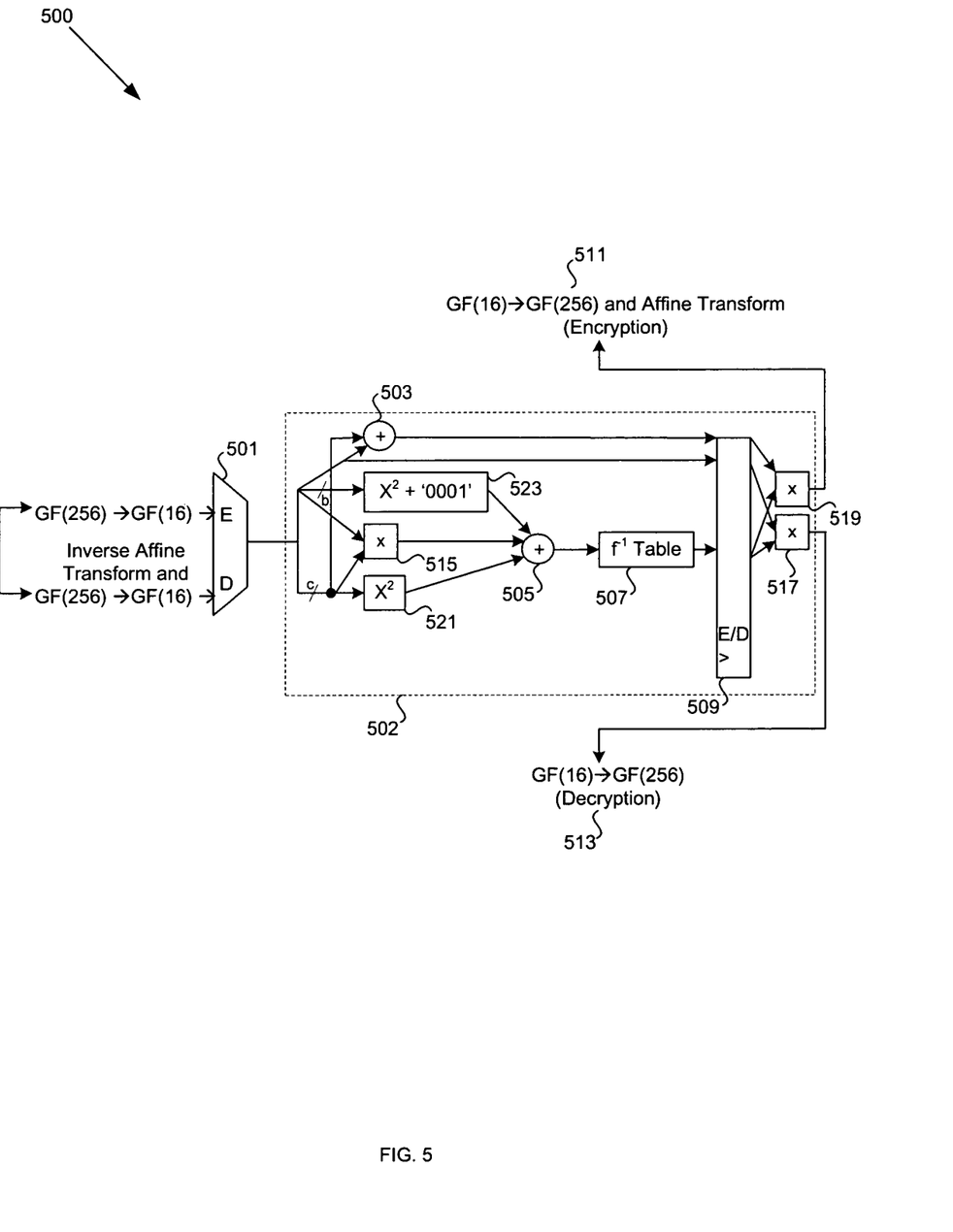
FIG. 5 is a block diagram of an S-box implementation that may be utilized by the hardware accelerator for AES encryption and decryption of FIG. 1, for example, in accordance with an embodiment of the invention.

FIG. 5 is a block diagram of an S-box implementation that may be utilized by the hardware accelerator for AES encryption and decryption of FIG. 1, for example, in accordance with an embodiment of the invention. Referring to FIG. 5, the S-box implementation 500 may comprise a multiplexer 501 and a GF(16) inversion logic 502. The GF(16) inversion logic 502 may comprise GF(16) operations 503, 507, 515, 517, 519, 521, and 523, and a register 509. The GF(16) operations 503, 507, 515, 517, 519, 521 and 523 may be the same GF(16) operations reflected on FIG. 4 and may be utilized for the GF(16) inversion transformation. For example, the GF(16) inversion function $f^{-1}$ may be implemented using a look-up table and the corresponding transform may be selected from the look-up table. The GF(16) inversion function $f^{-1}$ may be similar to the inversion function 415 on FIG. 4.

In operation, the S-box implementation 500 may be utilized for GF(256) inversion transformation during encryption or decryption. The multiplexer 501 may be selected so that both encryption and decryption operation may be handled by the S-box implementation 500. For example, during encryption, the GF(16) inversion logic 502 may return a result 511 by transforming GF(16) to GF(256) and performing an affine transformation. During decryption, the GF(16) inversion logic 502 may return a result 513 by transforming GF(16) to GF(256).

Figure 6:
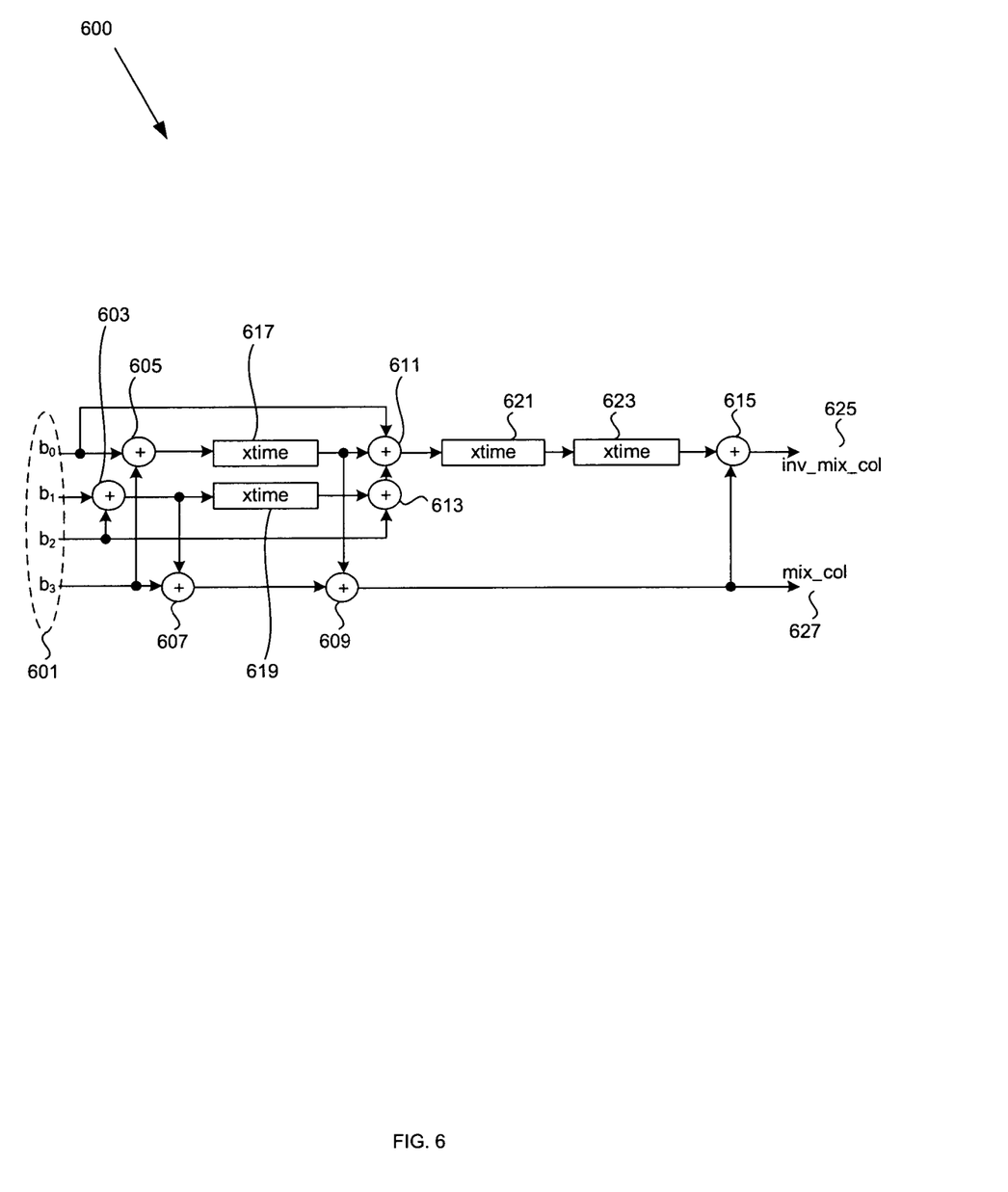
FIG. 6 is a block diagram of a column mixing functionality implementation, in accordance with an embodiment of the invention.

FIG. 6 is a block diagram of a column-mixing functionality implementation, in accordance with an embodiment of the invention. Referring to FIG. 6, the column-mixing functionality implementation 600 may be utilized to perform a column mixing operation, MixCol, during encryption, and an inverse column mixing operation, InvMixCol, during decryption. The MixCol and InvMixCol may utilize the following equations (8) and (9), specified in the AES encryption/decryption standard:

$$\text{MixCol: } a(x)=\{03\}x^3+\{01\}x^2+\{01\}x+\{02\} \quad (8)$$

$$\text{InvMixCol: } a^{-1}(x)=\{0b\}x^3+\{0d\}x^2+\{09\}x+\{0e\} \quad (9)$$

In one aspect of the invention, a hardware accelerator for AES encryption and decryption may utilize the following equations (10) and (11), which may be derived from the standard equations (8) and (9) above:

$$\text{mix\_col}=\text{xtime}(b_3\hat{}b_0)\hat{}(b_2\hat{}b_1)\hat{}b_3 \quad (10)$$

$$\text{inv\_mix\_col}=\text{xtime}(\text{xtime}(\text{xtime}(b_2\hat{}b_1)\hat{}\text{xtime}(b_3\hat{}b_0)\hat{}b_2\hat{}b_0)) \quad (11)$$

Referring again to FIG. 6, GF(256) multiplication operators 617, 619, 621, and 623 may be utilized, together with addition operators 603, 605, 607, 609, 611, 613, and 615 to obtain mix_col result 627 or an inv_mix_col result 625 after transforming an initial column 601.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of accelerating Advanced Encryption Standard (AES) operations, the method comprising:
    time multiplexing, by a hardware accelerator chip, a plurality of substitution boxes (S-boxes) to facilitate instantaneous key generation and byte substitution, by sharing said plurality of S-boxes during said key generation and during said byte substitution for encryption and decryption,
        wherein said byte substitution comprises substituting bytes in at least a portion of a current security key information, and
        wherein a subsequent security key information is generated by utilizing said at least portion of said current security key information; and
    storing, by said hardware accelerator chip, said current security key information,
        wherein said subsequent security key information comprises a first portion and a second portion, wherein the method further comprises generating, by said hardware accelerator chip, said first portion of said subsequent security key information by utilizing said at least portion of said current security key information and by utilizing said second portion of said subsequent security information.

2. The method of claim 1, wherein said instantaneous key generation comprises generating said current security key information and generating said subsequent security key information.

3. The method of claim 1, wherein said current security key information comprises 128 bits, 192 bits or 256 bits.

4. The method of claim 1, wherein said at least portion of said current security key information comprises 32 bits.

5. The method of claim 1, further comprising communicating, by said hardware accelerator chip, said at least portion of said current security key information to a key generator.

6. The method of claim 1, further comprising substituting bytes, by said hardware accelerator chip, in at least a portion of a data block within said plurality of S-boxes.

7. The method of claim 6, wherein said at least a portion of said data block comprises 32 bits.

8. The method of claim 1, further comprising shifting bytes, by said hardware accelerator chip, in at least a portion of a data block within said plurality of S-boxes.

9. A machine readable storage device having stored thereon, a computer program having at least a code section that accelerates Advanced Encryption Standard (AES) operations, the at least a code section being executable by a machine to:

time multiplex, within a hardware accelerator chip, a plurality of substitution boxes (S-boxes) to generate a current security key information and a subsequent security key information;

time multiplex, within the hardware accelerator chip, the plurality of S-boxes to substitute bytes in at least a portion of said current security key information, said subsequent security key information being generated by utilizing said substituted at least a portion of said current security key information, thereby sharing said same plurality of S-boxes during said generation of said current security key information and said subsequent security key information and during substituting bytes in said at least a portion of said current security key information for encryption and decryption; and store said current security key information, wherein said subsequent security key information comprises a first portion and a second portion, wherein said machine readable storage device further comprises comprising code that generates said first portion of said subsequent security key information by utilizing said at least a portion of said current security key information and by utilizing said second portion of said subsequent security key information.

10. The machine readable storage device of claim 9, wherein said current security key information comprises 128 bits, 192 bits or 256 bits.

11. The machine readable storage device of claim 9, wherein said at least a portion of said current security key information comprises 32 bits.

12. The machine readable storage device of claim 9, further comprising code that communicates said substituted at least a portion of said current security key information to a key generator.

13. The machine readable storage device of claim 9, comprising code that substitutes bytes in at least a portion of a data block within said plurality of S-boxes.

14. The machine readable storage device of claim 13, wherein said at least a portion of said data block comprises 32 bits.

15. The machine readable storage device of claim 9, comprising code that shifts bytes in at least a portion of a data block within said plurality of S-boxes.

16. A system comprising:
within a hardware accelerator chip, a plurality of time-multiplexed substitution boxes (S-boxes) operable to facilitate performing instantaneous key generation and byte substitution, wherein said plurality of time-multiplexed S-boxes are shared during said key generation and during said byte substitution for encryption and decryption; and within a hardware accelerator chip, a key generator operable to generate a current security key information and a subsequent security key information, wherein said subsequent security key information comprises a first portion and a second portion;

wherein said plurality of time-multiplexed S-boxes is operable to substitute bytes in at least a portion of said current security key information, said first portion of said subsequent security key information being generated by utilizing said substituted at least a portion of said current security key information and by utilizing said second portion of said subsequent security key information.

17. The system of claim 16, wherein said current security key information comprises 128 bits, 192 bits or 256 bits.

18. The system of claim 16, wherein said at least a portion of said current security key information comprises 32 bits.

19. The system of claim 16, wherein said key generator is operable to receive said substituted at least a portion of said current security key information.

20. The system of claim 16, comprising a storage block operable to store said current security key information.

21. The system of claim 16, wherein said plurality of time-multiplexed S-boxes substitute bytes in at least a portion of a data block within said plurality of S-boxes.

22. The system of claim 21, wherein said at least a portion of said data block comprises 32 bits.

23. The system of claim 16, comprising a plurality of multiplexers that shift bytes in at least a portion of a data block within said plurality of time-multiplexed S-boxes.

* * * * *